United States Patent
Payer et al.

(10) Patent No.: US 7,157,532 B2
(45) Date of Patent: Jan. 2, 2007

(54) METHOD FOR THE PRODUCTION OF OLEFIN POLYMERS AND SELECTED CATALYSTS

(75) Inventors: Wolfgang Payer, Wesel (DE); Jens Ehlers, Hamminkeln (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/476,959

(22) PCT Filed: May 7, 2002

(86) PCT No.: PCT/EP02/05026

§ 371 (c)(1),
(2), (4) Date: Dec. 2, 2003

(87) PCT Pub. No.: WO02/094891

PCT Pub. Date: Nov. 28, 2002

(65) Prior Publication Data

US 2004/0152850 A1     Aug. 5, 2004

(30) Foreign Application Priority Data

May 8, 2001 (DE) ................................ 101 22 111

(51) Int. Cl.
*C08F 4/06* (2006.01)
(52) U.S. Cl. ............... 526/118; 526/348; 526/123.1; 526/124.3; 502/103; 502/115; 502/118
(58) Field of Classification Search ........... 526/348, 526/123.1, 124.3, 118; 502/103, 115, 118
See application file for complete search history.

(56) References Cited

U.S. PATENT DOCUMENTS

| 3,917,466 | A | | 11/1975 | Henry, Jr. |
| 4,059,720 | A | * | 11/1977 | Kolling et al. ............. 526/74 |
| 4,182,810 | A | * | 1/1980 | Willcox ...................... 526/64 |
| 4,447,587 | A | | 5/1984 | Berthold et al. |
| 5,298,474 | A | * | 3/1994 | Luciani et al. ............. 502/115 |
| 6,114,271 | A | | 9/2000 | Bilda et al. |

FOREIGN PATENT DOCUMENTS

| DE | 23 61 508 | 12/1975 |
| DE | 25 48 416 | 5/1976 |
| EP | 0 005 215 | 11/1979 |
| EP | 0 068 257 | 1/1983 |
| EP | 0 107 127 | 5/1984 |
| EP | 0 223 011 | 5/1987 |
| EP | 0 645 403 | 3/1995 |

* cited by examiner

*Primary Examiner*—Ling-sui Choi
(74) *Attorney, Agent, or Firm*—Connolly Bove Lodge & Hutz

(57) ABSTRACT

A process for preparing olefin homopolymers or copolymers by polymerization of at least one olefin in a hydrocarbon (mixture) in the presence of a molar mass regulator, a mixed catalyst and a substance which increases the electrical conductivity of the hydrocarbon (mixture) and is soluble in the hydrocarbon or the mixture of hydrocarbons or which reacts with components of the mixed catalyst, wherein the mixed catalyst is obtainable by reaction of a magnesium alkoxide with titanium(IV) halide and comprises titanium in the oxidation states four and three and also an organic aluminum compound, where the molar ratio of Ti(IV) to Ti(III) is from 100:1 to 1:100.

The process makes it possible to prepare, in particular, polyethylenes having an ultrahigh molecular weight. The formation of deposits on the walls during the polymerization is significantly reduced.

15 Claims, No Drawings

METHOD FOR THE PRODUCTION OF OLEFIN POLYMERS AND SELECTED CATALYSTS

The present invention relates to a process for preparing homopolymers and/or copolymers of olefins, in particular ethylene, having a high molar mass by low-pressure polymerization.

Processes for the polymerization of olefins have been described many times and are carried out industrially on a large scale. The preparation of such polymers, for example polypropylene or polyethylene, can be carried out with the aid of Ziegler-Natta catalysts.

The low-pressure polymerization of olefins using Ziegler-Natta catalysts, i.e. mixtures of compounds of transition groups IV to VI of the Periodic Table of the Elements with organometallic compounds of groups I to III of the Periodic Table, has been found to be very useful for the preparation. In such catalysts, titanium alkyls and aluminum alkyls or alkylaluminum halides have the greatest importance. In established processes, the Ziegler-Natta catalysts are prepared by reduction of Ti(IV) compounds, e.g. $TiCl_4$ or esters of titanic acid, by organoaluminum compounds (DE-C-2 361 508, EP 0 645 403).

A higher catalyst activity and thus an improved polymer color is achieved by use of $MgCl_2$ as support component. U.S. Pat. No. 6,114,271 describes, for example, the reaction of a Grignard compound with $TiCl_4$.

If the polymerization is carried out in suspension, agglomeration of the polymer particles formed and settling as a deposit on the walls of the reactor is frequently observed. Such phenomena are undesirable, since they adversely affect heat transfer and thus the possible throughput; in addition, the agglomerates can grow until they are relatively large, so that the output of product is adversely affected.

There have therefore been numerous attempts to prevent the formation of polymer agglomerates.

EP-A-0,005,215 discloses a process for preparing olefin polymers in which the tendency of the polymer particle to agglomerate is reduced by addition of a specific antifouling agent. A proposed antifouling agent is, in particular, the product Stadis 450, which comprises a polysulfone and a polymeric polyamine. Such compositions are described in U.S. Pat. No. 3,917,466.

EP-A-0,107,127 proposes reducing the tendency of polyolefin particles to form agglomerates by means of a combination of various measures, for example use of a specific supported transition metal catalyst having a low proportion of fines, the use of particularly smooth reactor walls, selection of particular flow conditions in the reactor and the addition of a compound having an antistatic action.

EP-A-0,068,257 discloses highly active Ziegler-Natta catalysts. These are obtained by reaction of a magnesium alkoxide with $TiCl_4$. These catalysts make it possible to prepare, for example, polyethylene having an ultrahigh molecular weight (hereinafter referred to as "UHMW-PE"). The catalyst is activated by addition of an organoaluminum compound. At a concentration of 1 mmol of triisobutylaluminum/l, polyethylene homopolymer having a molar mass of $2 \times 10^6$ g/mol was prepared in suspension at a pressure of 2.8 MPa and a temperature of 75° C. The polymer has a high notched impact toughness (in accordance with ISO 11524-2).

Deposit formation on the walls of the reactor is an increased problem when using highly active catalysts, in particular in the preparation of UHMW-PE. The polymerization plant then has to be shut down and cleaned frequently.

The probability of the formation of polymer agglomerates is appreciably increased by electrostatic interactions. This phenomenon is, inter alia, also known in the handling of polymer powders. Owing to the fact that the polymer particles are not electrically conductive, electrostatic charging occurs in pneumatic transport systems in an electrically nonconductive environment, and this can lead to wall deposits and finally to blockages. A similar occurrence is to be expected in polymerization processes. The polyolefin particles move quickly in a nonconductive medium, e.g. the monomer in the gas or liquid phase or an aliphatic hydrocarbon, and become charged as a result. Polymer agglomerates and polymer deposits on the reactor walls are consequently observed. The immobilized polymer particles grow to form a firmly adhering coating on the reactor wall, and this significantly impairs a heat transfer. This coating has to be removed mechanically from the empty reactor.

The preparation of polyolefins having high molecular weight, in particular UHMWP-PE, requires a high purity of the entire polymerization system. This avoids secondary reactions which prevent the formation of molecules having a particularly high molar mass. As a result, the catalyst activity increases and the formation of agglomerates due to "hot spots" becomes relevant.

EP-A-0,645,403 discloses a process for preparing UHMW-PE, in which the product is obtained with the aid of selected and highly active Ziegler-Natta catalysts in a stirred tank reactor.

Starting out from this prior art, it is an object of the invention to provide a process for preparing polyolefins in which, firstly, use is made of highly active catalysts by means of which high molecular weight polymers can be prepared and, at the same time, deposit and agglomerate formation is greatly reduced.

The present invention provides a process for preparing olefin homopolymers or copolymers by polymerization of at least one olefin in a hydrocarbon or a mixture of hydrocarbons in the presence of a molar mass regulator, a mixed catalyst and a substance which increases the electrical conductivity of the hydrocarbon or the mixture of hydrocarbons and is soluble in the hydrocarbon or the mixture of hydrocarbons or which reacts with components of the mixed catalyst, wherein the mixed catalyst is obtainable by reaction of a magnesium alkoxide with titanium(IV) halide, preferably with $TiCl_4$, and comprises titanium in the oxidation states four and three and also an organic aluminum compound, where the molar ratio of Ti(IV) to Ti(III) is from 100:1 to 1:100, preferably from 10:1 to 1:1.

As magnesium alkoxide, it is possible to use compounds of the formula $Mg(OR^1)_2$ or $MgHal(OR^1)$, where Hal is a halogen atom, preferably chlorine, $R^1$ is a monovalent aliphatic, cycloaliphatic, aromatic or aralphatic radical, preferably an alkyl radical having from 1 to 6 carbon atoms; or it is possible to use complexes which comprise radicals of the above-defined formula $OR^1$ and magnesium together with at least one metal of main groups 1 to 4 of the Periodic Table. Examples of such complex magnesium alkoxides may be found in EP-A-68,257.

As titanium(IV) halide, it is possible to use compounds of the formula $Ti(Hal)_4$ or the formula $Ti(Hal)_a(OR^1)_{4-a}$, where Hal and $R^1$ are as defined above and a is an integer from 1 to 3.

The olefins to be polymerized according to the invention are generally α-olefins. Examples are ethylene, propylene, 1-butene, 1-pentene and 1-hexen. Preference is given to propylene and in particular ethylene. Apart from homopolymers, copolymers of at least two olefins, for example ethylene-propylene copolymers or ethylene or propylene copolymers with higher α-olefins such as 1-pentene, are also included.

Particular preference is given to using ethylene and preparing ethylene homopolymers having an ultrahigh molecular weight. For the purposes of the present invention, these are linear polyethylenes having a viscometrically determined mean molar mass of at least $10^5$ g/mol. The molar masses are determined from the solution viscosity according to the Margolies equation (described in CZ Chemie Technik 4 (1974) 129 ff).

Owing to its particular mechanical properties, e.g. the high resistance to wear and excellent toughness behavior, the material is of particular importance. It is widely used in the textile and chemical industries and in mechanical engineering and mining.

The catalysts used according to the invention allow the preparation of olefin polymer powders having an adjustable bulk density. Preference is given to producing polyolefins having a bulk density of from 350 to 550 g/l.

The process of the invention is a low-pressure polymerization in the liquid phase. The polymerization is preferably carried out in suspension in one or more stages, continuously or batchwise at temperatures of from 30 to 130° C., preferably from 50 to 90° C., in particular from 65 to 90° C., and a partial pressure of the monomer to be polymerized of less than 4.0 MPa, preferably from 0.01 to 2 MPa, particularly preferably from 0.05 to 1.0 MPa and very particularly preferably from 0.05 to 0.6 MPa.

The polymerization can be carried out, for example, in stirred vessels or in loop reactors.

Surprisingly, it is not necessary for the reactor walls to be particularly smooth. Thus, good results can also be achieved using reactors whose walls have a peak-to-valley height (determined in accordance with DIN 7162) of 3 μm or above.

As dispersion media or solvents for the polymer particles formed, the catalyst and, if appropriate, the monomers, use is made of hydrocarbons or mixtures thereof.

Examples are aliphatic or cycloaliphatic hydrocarbons, e.g. butane, pentane, hexane, heptane, isooctane, their higher homologues or hydrogenated distillate fractions which have been carefully freed of oxygen, sulfur compounds and moisture. Preference is given to using aliphatic hydrocarbons or mixtures thereof.

The hydrocarbons are electrical insulators.

It has been found that the addition of a substance which increases the electrical conductivity of the hydrocarbon reduces the tendency of the polymer particles to form agglomerates and deposit on the reactor walls, without the activity of the catalyst system being adversely effected thereby.

The substance is to be used in such an amount that an increase in the electrical conductivity of the hydrocarbon occurs. Apart from polyionic compounds which are soluble in the hydrocarbon, it is also possible to use substances which react with components of the reaction mixture, for example with catalyst constituents, and thereby increase the electrical conductivity. However, addition of too much of the additives can result in the opposite effect and insoluble compounds can be formed in the hydrocarbon, so that the desired effect comes to nothing and the formation of firmly adhering wall deposits is promoted.

Preferred substances are oxygen, protic compounds which are soluble in the hydrocarbon, e.g. water, alcohols, carboxylic acids, sulfonic acids or mineral acids, and polyionic compounds which are soluble in the hydrocarbon, e.g. polymeric polyamines. These latter compounds are commercially available in combination with polysulfones under the trade name Stadis (Octel).

The substances which increase the electrical conductivity of the hydrocarbon can be added to the hydrocarbon (dispersion medium) containing the organoaluminum compounds prior to entry into the reactor. Deposit formation can be reduced efficiently in this way. It is possible to employ substances which are soluble in the dispersion medium used and are able to conduct away electric charges.

Advantageously, the conductivity and thus the reduction in the electrostatic charges can be controlled within a wide range without impairing the catalyst activity. For this purpose, it is possible to use substances which convert part of the organoaluminum compounds into soluble, ionic components.

Examples are atmospheric oxygen and protic components such as water, alcohols, carboxylic acids or analogous substances.

Up to a ratio of 0.15, soluble organometallic compounds which increase the electrical conductivity of the solution are usually formed.

When larger amounts of atmospheric oxygen or a protic component are introduced, sparingly soluble components can be formed, so that the conductivity finally drops again and the desired effect does not occur. The sparingly soluble components can lead to undesirable formation of firmly adhering wall deposits.

The electrical conductivity of the dispersion medium can therefore be increased only to a particular value by this method and, in addition, is dependent on the content of organoaluminum compound.

When atmospheric oxygen or protic components are introduced in relatively large amounts, the substances considerably impair the catalyst activity, so that the polymerization process becomes very difficult to control. Owing to these disadvantages, it is therefore an objective to keep relatively large amounts of such substances out of the system.

Preference is given to using the antistatics Stadis 450 and, in particular, Stadis 425. These are solutions of polyamines, polysulfones and a sulfonic acid in a solvent mixture comprising isopropanol, toluene and relatively high-boiling aromatic hydrocarbons (DE-A-2,548,416, U.S. Pat. No. 3,917, 466). The active content is about 15% by weight in the case of Stadis 425. The active substances in the component Stadis 425 are added to the dispersion medium in a concentration ranging from 0.1 to 50 ppm, in particular from 0.2 to 10 ppm, preferably from 0.3 to 5 ppm.

The preferred process is found to have the advantage that both the catalyst activity (in this case as reduced catalyst space-time yield [kg of PE/mmol of Ti×h×bar]) and also the polymerization properties remain uninfluenced by the amount metered in. This is of particular importance when the aluminum alkyl concentration in the process is very low and the system is therefore very sensitive to adverse influences from the outside.

Thus, a concentration of up to 30 ppm of Stadis 425 has no influence on the catalyst activity, while a concentration of only 25 ppm/l of Stadis 450 can reduce the catalyst activity by about 25%.

The amount of conductivity-increasing additive introduced can, in a continuous polymerization process, be controlled via the thermal resistance and/or the electrical conductivity of the dispersion medium.

The opportunity of introducing a large quantity without influencing the catalyst makes it possible to use fast-running centrifuges for economic isolation of the polymers.

The catalyst used according to the invention is a mixed catalyst comprising titanium in the oxidation states four and three together with an organic aluminum compound. The molar ratio of Ti(IV) to Ti(III) is from 100:1 to 1:100.

Such mixed catalysts are known from EP-A-0,068,257 for the preparation of polyolefins such as polyethylene.

The preparation of the mixed catalyst used according to the invention can be carried out by methods described in the present text.

Thus, the titanium component of the mixed catalyst is prepared by the method Of EP-A-0,068,257 from a magnesium alkoxide and titanium tetrahalide, e.g. $TiCl_4$, in a first step. This catalyst is preactivated by means of an organoaluminum compound. Here, the Ti(IV) component is converted into the Ti(III) component and the ratio of Ti(IV) to Ti(III) is set according to the invention.

The preactivation is preferably carried out using trimethylaluminum, triethylaluminum or triisobutylaluminum with partial conversion of the Ti(IV) component into the Ti(III) component, with the molar ratio of Ti(IV) to Ti(III) being from 1.5:1 to 10:1, in particular from 2.0:1 to 3.0:1, preferably 2.6:1. Very particular preference is given to using triethylaluminum as organoaluminum component.

In contrast to the teachings of EP-A-0 107 127, it is not necessary for the mixed catalysts to have only a small proportion of fines. In the catalyst used according to the invention, the proportion of fines below 2 μm is typically from 12 to 80% by weight, based on the total amount of catalyst.

The preparation of a mixed catalyst which is preferably used according to the invention is described in detail below.

The reaction of magnesium ethoxide with titanium tetrachloride is carried out in a molar ratio of from 1:0.5 to 1:4, preferably from 1:1 to 1:3, in particular from 1:1.5 to 1:2.5, in an aliphatic hydrocarbon. The reaction temperature is 50–100° C., preferably 60–95° C., in particular 80–90° C. After a reaction time of from 4 to 10 hours, in particular from 5 to 8 hours, the temperature is increased to from 100 to 200° C., in particular from 110 to 140° C.

After from 40 to 100 hours, in particular from 50 to 80 hours, the suspension is cooled to a temperature of from 60 to 80° C., decanted and the solid is washed a number of times.

To set the desired degree of preactivation, for example from 10 to 40% of Ti(III), preferably from 15 to 35% of Ti(III), the catalyst solid is reacted with an organoaluminum compound.

Preferred organoaluminum compounds correspond to the formula $AlR_{3-m}^2X_m$. In this formula, m is 0, 1 or 2; $R^2$ are identical or different alkyl radicals having from 1 to 12, in particular from 2 to 6 carbon atoms; X is halogen, in particular chlorine or bromine.

Examples of organoaluminum compounds are triethylaluminum, tributyl aluminum, triisobutylaluminum, trihexylaluminum, trioctylaluminum, ethylaluminum sesquichloride, ethylaluminum dichloride, diisobutylaluminum chloride, isobutylaluminum dichloride, diethylaluminum iodide, diisobutylaluminum hydride, diethylaluminum ethoxide, isoprenylaluminum (preferably 70% strength in hexane), dimethylaluminum chloride and diethylaluminum chloride. The organoaluminum compounds can be used in pure form or as mixtures.

Preference is given to using triethylaluminum in a molar ratio to titanium of from 0.05:1 to 0.2:1, preferably from 0.07:1 to 0.17:1, in particular from 0.1:1 to 0.15:1.

The reaction is carried out at 50–120° C., in particular 60–110° C., preferably 70–100° C. The catalyst is subsequently decanted off.

A catalyst preactivated with triethylaluminum ("TEA"), in particular, displays a significantly lower tendency to form deposits.

The degree of preactivation is set in a stable fashion for a relatively long storage time by means of this procedure, which allows larger batches to be processed and allows reproducible production conditions to be set over a long period. The resulting solid is metered into a continuously operated stirred reactor.

As dispersion medium for the mixed catalyst, use is made of a hydrocarbon (mixture). It is possible to use the same hydrocarbons as those used in carrying out the polymerization. Examples are given above.

To activate the preactivated catalyst, an organoaluminum compound is added to the dispersion medium. Examples of such compounds are given above in the description of the preactivation.

Preference is given to triisobutylaluminum or isoprenylaluminum, whose use makes it possible to prepare polymers in a very broad molar mass range.

The concentration of the organoaluminum component is preferably from $5 \times 10^{-6}$ to $5 \times 10^{-4}$ mol of Al/l, in particular from $1 \times 10^{-5}$ to $4 \times 10^{-4}$ mol of Al/l, preferably from $2 \times 10^{-5}$ to $2 \times 10^{-4}$ mol of Al/l.

Preactivated mixed catalysts which are activated using relatively small amounts of organoaluminum compounds have not been described hitherto and have a considerably increased activity.

The invention therefore also provides a mixed catalyst which is supported on magnesium compounds and has been preactivated by means of an organic aluminum compound dispersed in a hydrocarbon (mixture) and can be used for the polymerization of olefins in inert solvents and which comprises titanium in the oxidation states four and three, where the molar ratio of Ti(IV) to Ti(III) is from 100:1 to 1:100, preferably from 10:1 to 1:1 and very particularly preferably 10:1 to 2:1, and the preactivated mixed catalyst has been activated by addition of less than 0.2 mmol/l, in particular less than 0.1 mmol/l and very particularly preferably from 0.005 to 0.09 mmol/l, based on the volume of hydrocarbon, of an alkylaluminum compound.

The low content of alkylaluminum compounds makes it possible to prepare polymers up to the range of extremely highly molar masses, as a result of which the sensitivity of this system increases again. Additives which have little interfering influence become particularly essential.

In a hydrocarbon, this catalyst solid comprising an organoaluminum compound whose concentration is preferably from $10^{-5}$ to $10^{-4}$ mol of Al/l or particularly preferably from $2\times10^{-5}$ to $10^{-4}$ mol of Al/l can be used for the polymerization of propylene or, in particular, ethylene.

The mixed catalyst used according to the invention is particularly preferably a supported catalyst. Magnesium compounds are particularly useful as support material.

Preferred mixed catalysts are obtainable by reaction of magnesium alkoxide with titanium tetrahalide in a molar ratio of from 1:0.5 to 1:4 in an aliphatic hydrocarbon and subsequent preactivation with an organoaluminum compound, with partial conversion of the Ti(IV) components into the Ti(III) components occurring and the molar ratio of Ti(IV) to Ti(III) being from 10:1 to 1:1.

The mixed catalyst used according to the invention is usually employed in a concentration of from $5*10^{-6}$ to $3*10^{-3}$ mol/l.

The formation of a firmly adhering polymer layer on the reactor wall can additionally be suppressed by carefully freeing, in particular, the hydrocarbon of traces of air and moisture. For this purpose, the hydrocarbon can be purified by distillation or by adsorption and can be saturated with nitrogen.

The intensive purification of the dispersion medium to remove by-products which act as catalyst poisons from the dispersion medium circuit may also not be necessary. Such a result occurs, in particular, when the product sequence makes the use of various, incompatible catalysts in one plant necessary. In these cases, a reproducibly good dispersion medium quality is essential and can be ensured in this way.

However, it has been found that in a liquid which has been purified in this way, electrostatic charges are dissipated only much more slowly and can instead even be increased again over the course of continuous production over a number of days. This occurs particularly when the circulated hydrocarbon is conveyed through the system at a high velocity. This results in polymer particles depositing on the reactor wall as a result of electrostatic interaction.

According to the invention, this is remedied by substances being added in a targeted fashion to the hydrocarbon, in particular the previously purified mixture was subsequently heated at 120° C. for 60 hours. The catalyst mixture was washed by adding 250 ml of solvent 4 times and siphoning it off each time. The mixture was reacted with 114 g of triethylaluminum at a temperature of 85° C. and subsequently decanted at room temperature. The mixture was reacted with 11.4 g of triethylaluminum at a temperature of 85° C. and subsequently decanted at room temperature.

EXAMPLE 2

Polymerization Experiments

The polymerization was carried out in a continuously operated plant in a single stage with recirculation of the inert liquid (dispersion medium) in a closed circuit. An aliphatic hydrocarbon having a boiling range from 140 to 170° C. (Exxsol D30) which had been purified over molecular sieves or KC beads was employed as dispersion medium. As cocatalyst, use was made of triisobutylaluminum ("TIBA") which was added to the dispersion medium before entry into the reactor. The PE discharged contained about 60% by weight of adhering dispersion medium, which was continuously replaced by introduction into the circuit (⅔) and directly into the reactor (⅓). Additives mentioned by way of example were added to the dispersion medium flowing in the circuit. The series of experiments were in each case concluded with a reference experiment in which no additives were introduced.

The ratio of dispersion medium to polyethylene was about 4.8 l/kg. The molar mass of the polymer was controlled via the hydrogen content of the gas phase.

EXAMPLE 2.1

Experiments Using Stadis 425

2.1.1. Influencing of the Catalyst Activity

The following table summarizes the results of the experiments. Up to an active compound concentration of 30 ppm in the dispersion medium, the catalyst activity (as reduced catalyst time yield (CTYred)) were not affected.

The reference experiments were carried out before and after introduction of the Stadis 425. Experiments without any addition were carried out at the beginning and end (experiments R1 and R2). The measurements listed in the following tables

TABLE

| Experiment | Temp. (° C.) | Active compound Stadis 425 (ppm/l) | CTYred (kg of PE/mmol of Ti*h*bar %) | cAlR3 (mmol/l) | $H_2$ (Vol %) | Bulk density (g/l) | OYS (MPa) |
|---|---|---|---|---|---|---|---|
| R1 | 77 | 0 | 0.20 | 0.14 | 2.6 | 400 | 0.30 |
| 2.1.1. | 80.5 | 4.5 | 0.19 | 0.15 | 2.1 | 411 | 0.29 |
| 2.1.2. | 78 | 15 | 0.21 | 0.17 | 1.8 | 405 | 0.34 |
| 2.1.3. | 77 | 30 | 0.20 | 0.15 | 1.8 | 405 | 0.34 |
| 2.1.4. | 80 | 60 | 0.17 | 0.14 | 1.9 | 415 | 0.35 |
| R2 | 78 | 0 | 0.20 | 0.15 | 1.6 | 400 | 0.30 |

2.1.2. Experiments Using Stadis 450

Stadis 450 was added in a procedure analogous to that of experiment 2.1.1. On the basis of information from the manufacturer (Octel), an active content of 25% was assumed. The series of experiments was concluded with a reference experiment (R4) without addition of additives.

TABLE

| Experiment | Temp. (° C.) | Active compound Stadis 425 (ppm/l) | CTYred (kg of PE/mmol of Ti*h*bar) | cAIR3 (mmol/l) | H₂ (Vol %) | Bulk density (g/l) | OYS (MPa) |
|---|---|---|---|---|---|---|---|
| 2.1.2. | 81 | 12 | 0.14 | 0.15 | 1.4 | 400 | 0.31 |
|  | 81 | 25 | 0.13 | 0.17 | 1.5 | 400 | 0.38 |
| 2.1.R4 | 79 | 0 | 0.16 | 0.17 | 1.3 | 430 | 0.38 |

2.1.3. Influencing of Deposit Formation

The experiments were carried out in a manner analogous to 2.1.1. and 2.1.2. Owing to optimized blanketing with nitrogen and the use of dispersion medium purified both by distillation and adsorption, a triisobutylaluminum concentration of less than 0.02 to 0.08 mmol/l was employed here.

TABLE

| Experiment | Addition (active compound) | Temperature fluctuations (° C.) | Running Time (days) | Observations after opening the reactor | Reduction in throughput |
|---|---|---|---|---|---|
| 2.2.1. | None | >3 | 4 | Loose deposit on the wall | >20% |
| 2.2.2. | 7 ppm of ethanol | >1.0 | 22 | Agglomerates and solid deposits on the wall | >5% |
| 2.2.3. | 0.3 to 2.2 ppm of Stadis 425 or 450 | <0.5 | >60 | No deposit, no agglomerates | None |

No effects on the physical properties such as the notched impact toughness, the color or the odor were found as a result of the addition of Stadis 425.

In experiment 2.2.R3., purification of the dispersion medium by absorption was omitted.

| Experiment | Solvent purification | Maximum running time [days] | Observations after opening the reactor | Reduction in throughput |
|---|---|---|---|---|
| 2.2.R3. | None | 40 | Agglomerates and thick, solid deposits on the wall | >10% |

The invention claimed is:

1. A process for preparing olefin homopolymers or copolymers which comprises polymerizing by polymerization of at least one olefin in a hydrocarbon or a mixture of hydrocarbons in the presence of a molar mass regulator, a mixed catalyst and a substance which increases the electrical conductivity of the hydrocarbon or the mixture of hydrocarbons and is soluble in the hydrocarbon or the mixture of hydrocarbons or which reacts with components of the mixed catalyst, wherein the mixed catalyst is obtainable by reaction of a magnesium alkoxide with titanium(IV) halide, and comprises titanium in the oxidation states four and three and also an organoaluminum compound, where the molar ratio of Ti(IV) to Ti(III) is from 100:1 to 1:100 and wherein up to a ratio component of 0.15, soluble organoaluminum compounds which increase the electrical conductivity of the solution are formed.

2. The process as claimed in claim 1, wherein the molar ratio of Ti(IV) to Ti(III) is from 10:1 to 2:1.

3. The process as claimed in claim 1, wherein the olefin to be polymerized is propylene or ethylene or a mixture of propylene and ethylene.

4. The process as claimed in claim 3, wherein the olefin is ethylene.

5. The process as claimed in claim 4, wherein the polymerization is carried out at temperatures of from 30 to 130° C. and partial pressures of the monomer to be polymerized of from 0.05 to 0.6 mPa.

6. The process as claimed in claim 1, wherein the substance which increases the electrical conductivity of the hydrocarbon or the mixture of hydrocarbons is selected from the group consisting of oxygen, protic compounds which are soluble in the hydrocarbon or the mixture of hydrocarbons and polyionic compounds which are soluble in the hydrocarbon or the mixture of hydrocarbons.

7. The process as claimed in claim 6, wherein the substance which increases the electrical conductivity of the hydrocarbon or the mixture of hydrocarbons is a mixture comprising at least one polysulfone and at least one polymeric polyamine.

8. The process as claimed in claim 6, wherein the substance which increases the electrical conductivity of the hydrocarbon or the mixture of hydrocarbons is water or an alcohol, where the molar ratio of water/aluminum or alcohol/aluminum does not exceed 0.15.

9. The process as claimed in claim 1, wherein the mixed catalyst is a supported catalyst.

10. The process as claimed in claim 1, wherein the mixed catalyst is obtainable obtained by reaction of magnesium alkoxide with titanium tetrahalide in a molar ratio of from 1:0.5 to 1:4 in an aliphatic hydrocarbon and subsequent preactivation by means of an organoaluminum compound, with partial conversion of the Ti(IV) component into the Ti(III) component occurring and the molar ratio of Ti(IV) to Ti(III) being from 10:1 to 1:1.

11. The process as claimed in claim 10, wherein the preactivation is carried out using trimethylaluminum, triethylaluminum or tripropylaluminum with partial conversion of the Ti(IV) component into the Ti(III) component and the molar ratio of Ti(IV) to Ti(III) being from 2.0:1 to 3.0:1.

12. The process as claimed in claim 9, wherein the catalyst obtained is used for the polymerization of ethylene and the concentration of the organoaluminum compound is from $10^{-5}$ to $10^{-4}$ mol of Al/l.

13. The process as claimed in claim 1, wherein said titanium(IV) halide is $TiCl_4$.

14. The process as claimed in claim 10, wherein the preactivation is carried out using trimethylaluminum, triethylaluminum or tripropylaluminum with partial conversion of the Ti(IV) component into the Ti(III) component and the molar ratio of Ti(IV) to Ti(III) being from 2.6:1.

15. The process as claimed in claim 9, wherein the catalyst obtained is used for the polymerization of ethylene and the concentration of the organoaluminum compound is $2\times10^{-5}$ to $10^{-4}$ mol of Al/l.

* * * * *

UNITED STATES PATENT AND TRADEMARK OFFICE
CERTIFICATE OF CORRECTION

| | |
|---|---|
| PATENT NO. | : 7,157,532 B2 |
| APPLICATION NO. | : 10/476959 |
| DATED | : January 2, 2007 |
| INVENTOR(S) | : Wolfgang Payer et al. |

It is certified that error appears in the above-identified patent and that said Letters Patent is hereby corrected as shown below:

In Claim 1, at column 9, line 64, "catalyst, wherein the mixed catalyst is obtainable by reaction" should read -- catalyst, wherein the mixed catalyst is obtained by reaction --.

In Claim 10, at column 10, line 66, "catalyst is obtainable obtained by reaction of magnesium" should read -- catalyst is obtained by reaction of magnesium --.

Signed and Sealed this

Twenty-fourth Day of April, 2007

JON W. DUDAS
*Director of the United States Patent and Trademark Office*